United States Patent
Ekambaram et al.

(10) Patent No.: US 10,380,657 B2
(45) Date of Patent: *Aug. 13, 2019

(54) RAPID COGNITIVE MOBILE APPLICATION REVIEW

(71) Applicant: International Business Machines Corporation, Armonk, NY (US)

(72) Inventors: Vijay Ekambaram, Tamilnadu (IN); Ashish K. Mathur, Bangalore (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 14/637,492

(22) Filed: Mar. 4, 2015

(65) Prior Publication Data

US 2016/0260143 A1 Sep. 8, 2016

(51) Int. Cl.
| | |
|---|---|
| *G06F 3/01* | (2006.01) |
| *G06Q 30/02* | (2012.01) |
| *G06K 9/00* | (2006.01) |
| *G06T 1/00* | (2006.01) |

(52) U.S. Cl.
CPC ......... *G06Q 30/0282* (2013.01); *G06F 3/012* (2013.01); *G06F 3/013* (2013.01); *G06K 9/00302* (2013.01); *G06T 1/0007* (2013.01); *G06K 2009/00328* (2013.01)

(58) Field of Classification Search
USPC ....................................................... 705/347
See application file for complete search history.

(56) References Cited

U.S. PATENT DOCUMENTS

| | | | |
|---|---|---|---|
| 8,108,255 B1 | 1/2012 | Robinson et al. | |
| 8,380,694 B2 | 2/2013 | Ruhl et al. | |
| 8,578,501 B1 | 11/2013 | Ogilvie | |
| 8,760,551 B2 | 6/2014 | Haikin et al. | |
| 9,171,198 B1 * | 10/2015 | Raffle | G06K 9/00281 |
| 2005/0289582 A1 * | 12/2005 | Tavares | G06K 9/00221 |
| | | | 725/10 |
| 2007/0150916 A1 | 6/2007 | Begole et al. | |

(Continued)

FOREIGN PATENT DOCUMENTS

| | | |
|---|---|---|
| CN | 102402765 A | 4/2012 |
| CN | 104103024 A | 10/2014 |

(Continued)

OTHER PUBLICATIONS

Ekambaram et al., "Rapid Cognitive Mobile Application Review", U.S. Appl. No. 14/879,189, 29 pages, filed Oct. 9, 2015.

(Continued)

*Primary Examiner* — Andrew B Whitaker
(74) *Attorney, Agent, or Firm* — Aaron N. Pontikos

(57) ABSTRACT

Mobile application reviewing is provided. An interaction, made by a user of a wearable device is identified. One or more facial expression data is received. A screenshot of a mobile application on a mobile device is captured. A user sentiment, corresponding to the screenshot, is determined, wherein the sentiment is based on the facial expression data. A mobile application rating corresponding to the user is determined wherein the mobile application rating is based on one or more screenshot ratings corresponding to the user.

9 Claims, 5 Drawing Sheets

(56) References Cited

U.S. PATENT DOCUMENTS

| | | | |
|---|---|---|---|
| 2011/0173191 A1 | 7/2011 | Tsaparas et al. | |
| 2013/0066800 A1 | 3/2013 | Falcone et al. | |
| 2013/0144802 A1 | 6/2013 | Bank et al. | |
| 2013/0173491 A1 | 7/2013 | Nations et al. | |
| 2013/0231989 A1 | 9/2013 | Abu Ayyash | |
| 2013/0275554 A1 | 10/2013 | Smith | |
| 2014/0267403 A1* | 9/2014 | Maciocci | G06T 19/006 345/633 |
| 2014/0278786 A1* | 9/2014 | Liu-Qiu-Yan | G06Q 30/0201 705/7.32 |
| 2014/0366049 A1* | 12/2014 | Lehtiniemi | H04N 21/44218 725/12 |
| 2015/0106384 A1* | 4/2015 | Go | G06F 8/77 707/748 |
| 2015/0220814 A1* | 8/2015 | Verkasalo | G06Q 20/322 382/103 |
| 2015/0293356 A1* | 10/2015 | Grigg | G02B 27/017 345/8 |
| 2016/0249106 A1* | 8/2016 | Lachwani | H04N 21/234309 |

FOREIGN PATENT DOCUMENTS

| | | |
|---|---|---|
| CN | 104170006 A | 11/2014 |
| CN | 104298682 A | 1/2015 |

OTHER PUBLICATIONS

Appendix P, List of IBM Patents or Patent Applications Treated as Related, 2 pages, dated Oct. 9, 2015.

Branco, Pedro, "Computer-based facial expression analysis for assessing user experience", doctoralThesis, This page was automatically generated in 2014-12-03T19:12:26Z with information provided by RepositoriUM, Sep. 2006, <https://repositorium.sdum.uminho.pt/bitstream/1822/8457/1/Tese%20de%20Doutoramento%20Pedro%20Branco.pdf>.

Scheirer et al., "Expression Glasses: A Wearable Device for Facial Expression Recognition", M.I.T Media Laboratory Perceptual Computing Section Technical Report No. 484, Submitted to CHI 99, May 1999, ACM ISBN: 1-58113-158-5,<http://vismod.media.mit.edu/tech-reports/TR-484.pdf >.

Staiano et al., "UX_Mate: From Facial Expressions to UX Evaluation", Dept. of Information Engineering and Computer Science, University of Trento Via Sommarive, 5-38123 Povo (TN), Italy, Jun. 11-15, 2012 • Newcastle, UK, DIS '12: Proceedings of the Designing Interactive Systems Conference. <http://disi.unitn.it/~staiano/pubs/SMBDS_DIS12.pdf>.

"Emotient Announces Private Beta for "Sentiment Analysis" Glassware for Google Glass",Feb. 27, 2014—San Diego, CA, © Copyright 2014 Emotient, Inc. <http://www.emotient.com/blog/emotient-announces-private-beta-%E2%80%9Csentiment-analysis%E2%80%9D-glassware-google-glass)>.

"Predicting purchase intention through emotion interpretation using facial expressions", An IP.com Prior Art Database Technical Disclosure, Authors et. al.: Disclosed Anonymously, IP.com No. IPCOM000218467D, IP.com Electronic Publication: Jun. 4, 2012.

"SmartWatch—System and Method to Utilize Wearable Devices for Rating Capture", An IP.com Prior Art Database Technical Disclosure, Authors et. al.: Disclosed Anonymously, IP.com No. IPCOM000232222D, IP.com Electronic Publication: Oct. 27, 2013.

"Which software do you use for facial expression analysis?", provided by inventor on Apr. 7, 2014, <http://ux.stackexchange.com/questions/51934/which-software-do-you-use-for-facial-expression-analysis>.

* cited by examiner

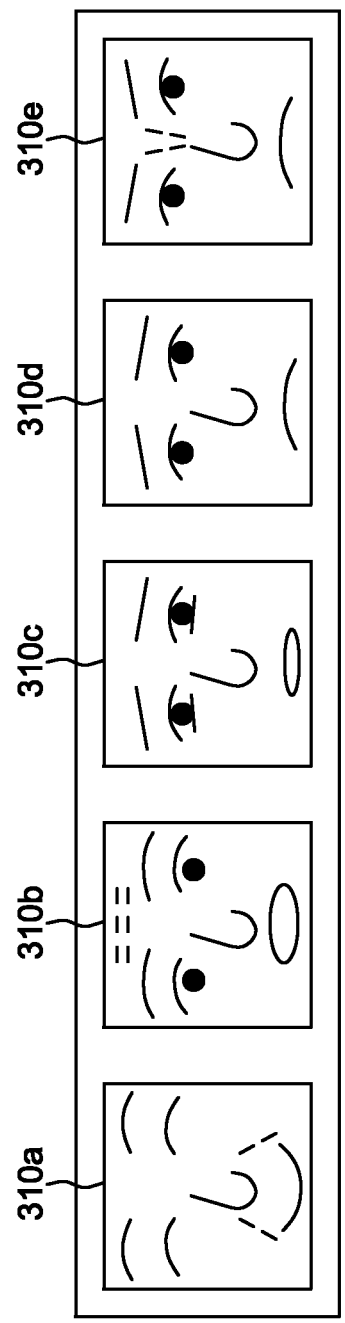

RAPID COGNITIVE MOBILE APPLICATION REVIEW

BACKGROUND OF THE INVENTION

The present invention relates generally to the field of mobile applications, and more particularly to reviewing mobile applications using a wearable computing device.

Mobile applications are computer programs designed to run on smartphones, tablet computers, and other mobile devices. Mobile applications are generally available through digital distribution platforms through which users can download applications to their mobile devices. In addition to distributing applications, such distribution platforms provide ratings for each of the available applications.

Application ratings are generally based on reviews written by application users. To leave a review of an application, the user exits the application on their mobile device, opens the distribution platform, and types a review using the mobile device. In addition to, or sometimes in lieu of, leaving a written review, the user can designate a star-rating to provide a visual representation of application experience. For example, the user can designate between one and five stars, wherein one star represents a highly negative experience and five stars represents a highly positive experience.

Small mobile computing systems enable the continued integration of computer system functionality into everyday life. For example, small mobile computing systems, such as miniaturized computers, input devices, sensors, detectors, image displays, wireless communication devices as well as image and audio processors, can be integrated into a device that can be worn by a user. Such small and potentially wearable computing systems can be used in conjunction with mobile devices, for example via wireless networking. Wearable computing devices used in conjunction with a mobile device can expand the functionality of applications for mobile devices.

SUMMARY

According to one embodiment of the present disclosure, a method for reviewing a mobile application is provided. The method includes identifying, by one or more processors of a wearable computing device, an interaction made by a user of the wearable computing device user and, in response: receiving, by one or more processors of a wearable computing device, one or more facial expression data; capturing, by one or more processors of a wearable computing device, a screenshot of a mobile application on a mobile device; determining, by one or more processors of a wearable computing device, a sentiment of the user corresponding to the screenshot, wherein the sentiment is based on the facial expression data; determining, by one or more processors of a wearable computing device, a mobile application rating corresponding to the user, wherein the mobile application rating is based on one or more screenshot ratings corresponding to the user.

According to another embodiment of the present disclosure, a computer program product for reviewing a mobile application is provided. The computer program product comprises a computer readable storage medium and program instructions stored on the computer readable storage medium. The program instructions include program instructions to identify an interaction made by a user of a wearable computing device and in response: program instructions to receive one or more facial expression data; program instructions to capture a screenshot of a mobile application on a mobile device; program instructions to determine a sentiment of a user corresponding to the screenshot, wherein the sentiment is based on the facial expression data; and program instructions to determine a mobile application rating corresponding to the user, wherein the mobile application rating is based on one or more screenshot ratings corresponding to the user.

According to another embodiment of the present disclosure, a computer system for reviewing a mobile application is provided. The computer system includes one or more computer processors, one or more computer readable storage media, and program instructions stored on the computer readable storage media for execution by at least one of the one or more processors. The program instructions include program instructions to identify an interaction made by a user of a wearable computing device and in response: program instructions to receive one or more facial expression data; program instructions to capture a screenshot of a mobile application on a mobile device; program instructions to determine a sentiment of a user corresponding to the screenshot, wherein the sentiment is based on the facial expression data; and program instructions to determine a mobile application rating corresponding to the user, wherein the mobile application rating is based on one or more screenshot ratings corresponding to the user.

BRIEF DESCRIPTION OF THE DRAWINGS

FIG. 3B depicts example facial expression patterns, in accordance with an embodiment of the present disclosure.

DETAILED DESCRIPTION

Embodiments of the present invention recognize that current methods of providing ratings for mobile applications require the user to suspend the application being rated, open a second application, and write a review using a user interface of the mobile device. Many users do not provide application ratings due to the cumbersome process involved. As application ratings are based on the opinions of only those users who complete the review process despite the burden, the application ratings are subject to the effects of a self-selection bias. Application ratings can be skewed (e.g., toward positive, neutral, or negative reviews), due to the non-representative sampling caused by self-selection.

Embodiments of the present invention provide for rating mobile applications with little explicit action on the part of the application user. Further, embodiments of the present invention provide operations to provide in-application feedback for mobile applications using a wearable computing device. The in-application feedback is an intrusive-free mechanism that associates a user expression to a screenshot of the application. The correlation between the expression and screenshot provides insight to the usability of various aspects of an application and allows for a weighted rating of the application.

Figure 1:
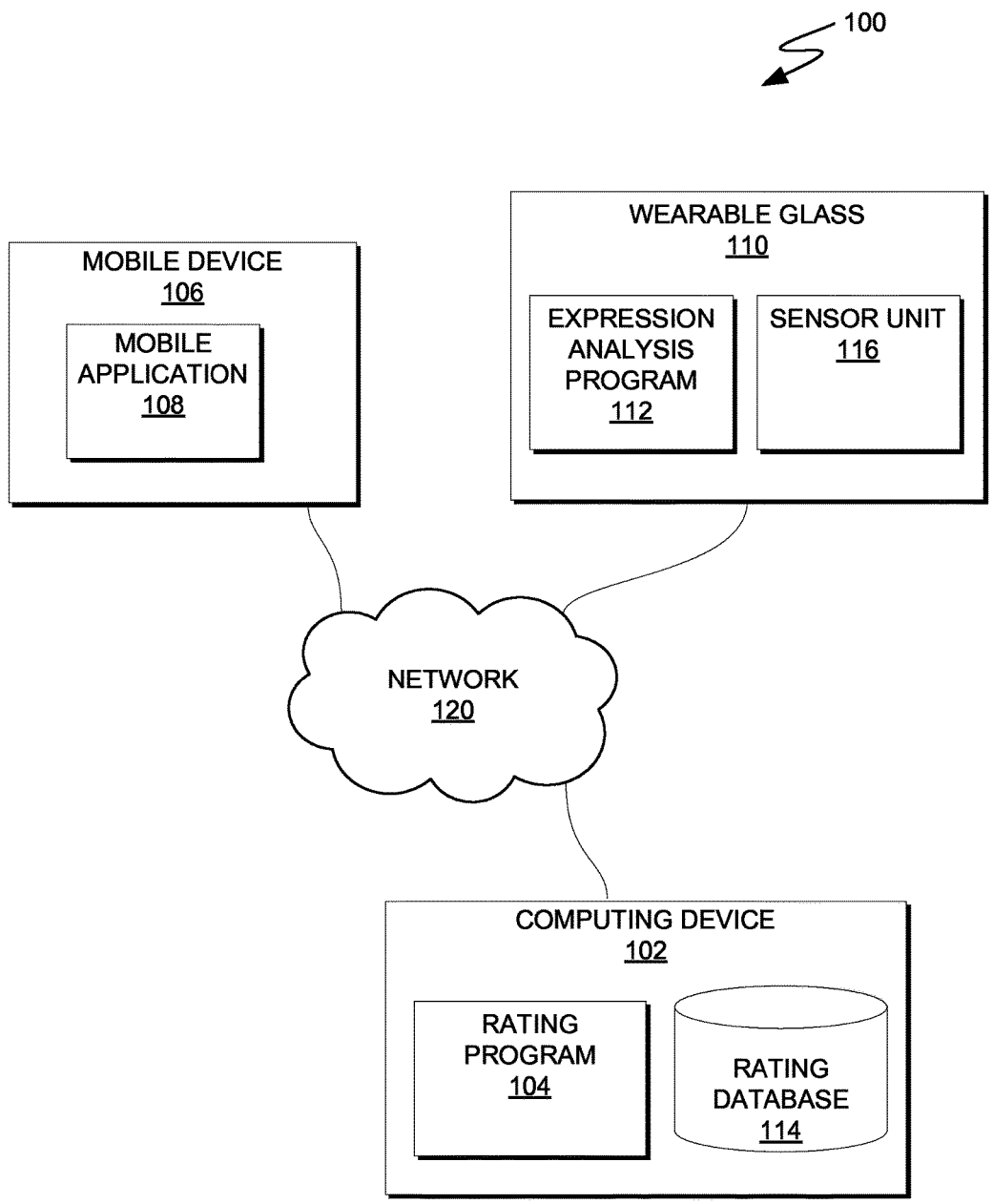
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes computing device 102, mobile device 106, and wearable device 110 connected over network 120. Computing device 102 includes rating program 104 and rating database 114.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to some or all of mobile device 106, wearable device 110, rating program 104 and rating database 114, and is capable of executing rating program 104. Computing device 102 may include internal and external hardware components, as depicted and described in further detail with respect to FIG. 4.

In this exemplary embodiment, rating program 104 and rating database 114 are stored on computing device 102. In other embodiments, rating program 104 and rating database 114 may reside on another computing device, provided that each can access and is accessible by each other of rating program 104, rating database 114, and mobile device 106. In yet other embodiments, rating program 104 and rating database 114 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102, mobile device 106, and wearable device 110, in accordance with a desired embodiment of the present invention.

Rating program 104 operates to aggregate individual user ratings to determine screenshot ratings and an application rating. Rating program 104 accesses rating database 114 to obtain individual user ratings. Screenshot ratings are determined by averaging the individual user ratings associated with a single screenshot. An average of the screenshot ratings is used to determine the application rating. In some embodiments, a weighted average of screenshot ratings is used to determine the application rating. For example, rating program 104 allocates twice the weight to screenshot two when four users provide ratings for screenshot one and eight users provide ratings for screenshot two. In other embodiments, a straight average of screenshot ratings is used to determine the application rating (e.g., each screenshot rating has equal weight).

Rating database 114 is a data repository that may be written to and read by rating program 104 and expression analysis program 112. Application rating data, e.g., user facial expression data, screenshots, and calculated user ratings, may be stored to rating database 114. In some embodiments, rating database 114 may be written to and read by programs and entities outside of computing environment 100 in order to populate the repository with alternative application ratings, e.g., ratings generated via user input in application store.

In various embodiments of the present disclosure, mobile device 106 can be a laptop computer, a tablet computer, a netbook computer, a personal digital assistant (PDA), a smart phone, or any mobile programmable electronic device capable of communicating with computing device 102 and wearable device 110 via network 120. As wearable device 110 contains user facial expression capabilities, a camera on mobile device 106 is not needed for operations of the present invention. Mobile device 106 includes mobile application 108 which executes locally on mobile device 106. Mobile application 108 is a computer program configured to display on mobile device 106. In some embodiments, mobile application 108 is a post-production application downloaded from a mobile distribution platform.

Wearable device 110 is a wearable technology with an optical head-mounted display. Wearable device 110 displays mobile device 106 information in a hands-free format. In some embodiments, wearable device 110 is controlled via natural language voice commands. In other embodiments, wearable device 110 is controlled via facial gestures. In yet other embodiments, wearable device 110 is controlled via interactions with a user interface located on wearable device 110. Wearable device 110 captures the facial expression of a user. In some embodiments, wearable device 110 captures a digital photo of the user face. In other embodiments, wearable device 110 documents facial expressions in the form of digital lines. For example, wearable device 110 recognizes and documents facial features, e.g., pupil size, eye movement, facial muscle movement, etc. In yet other embodiments, wearable device 110 captures data through various sensors including, but not limited to, eye tracking sensors and muscle movement sensors. Wearable device 110 also captures the user focus area on the screen of mobile device 106. Wearable device 110 includes expression analysis program 112 and sensor unit 116.

Expression analysis program 112 executes locally on wearable device 110. Expression analysis program 112 transforms raw data captured by sensor unit 116 into quantitative ratings for mobile applications. The raw data includes captured facial expressions, which are used to determine the user sentiment. A sentiment is a reaction, opinion, feeling, or attitude toward a screenshot of application 108, such as an opinion prompted by a feeling. Facial expressions are captured using sensors located in sensor unit 116 on wearable device 110. Expression analysis program 112 uses sentiment data to generate a screenshot rating. Expression analysis program 112 communicates with rating database 114 via network 120. Raw data, sentiment data, screenshot data, and rating data are written to and read from rating database 114.

Expression analysis program 112 determines the user sentiment using one or more facial recognition techniques. In one embodiment, expression analysis program 112 analyzes a video feed of the user, captured by a camera in sensor unit 116, to determine the user sentiment or reaction to a screenshot of application 108. For example, the video feed captures the user facial expressions and facial movements. In another embodiment, expression analysis program 112 analyzes sensor data (e.g., data from an eye tracking sensor), captured by a sensor in sensor unit 116, to determine the user sentiment or reaction to a screenshot of application 108. For example, the sensor measures the user eye movement or muscle movement. Expression analysis program 112 accesses rating database 114 to retrieve known facial expressions, facial movements, or eye movements associated with each sentiment (e.g., happiness, frustration, confusion, attention, boredom, neutrality, anger, laughter, or polarity such as positive reaction and negative reaction) for use in the sentiment analysis. In some embodiments, the range of sentiment is converted to a scaled rating of one to five, wherein a one is highly negative, two is negative, three is neutral, four is positive, and five is highly positive.

In some embodiments, expression analysis program 112 has the capability to learn characteristic expressions of the user. For example, expression analysis program 112 stores facial expression and sentiment data on local memory of wearable device 110. In this exemplary embodiment, expression analysis program 112 has functionality allowing user to approve or correct determined sentiments. For example, expression analysis program 112 determines the user with a slight frown is sad, indicating a negative sentiment; however, the lips of the user have a natural down-curve. The user can correct the determined expression to neutral. Expression analysis program 112 can then improve sentiment analysis for the user. Expression analysis program 112 can use knowledge based learning programming to learn user characteristic expressions to more accurately determine the sentiment of the characteristic expressions. In this embodiment, expression analysis program 112 uses historical sentiment data from rating database 114 when historical user data is unavailable.

For example, applying facial recognition algorithms to sensor data of a user who has a slight frown and rapid eye movement may match a facial expression correlating to a sentiment of confusion, stored in rating database 114. Expression analysis program 112 analyzes the user facial expressions and facial movements looking at both an individual facial feature and a totality of the facial features for an expression on the face. Using facial recognition techniques, expression analysis program 112 compares the individual facial features and expressions of the user to similar facial features and expressions from known sentiment expressions to determine or match a corresponding sentiment. In some embodiments, the sentiments used by expression analysis program 112 include a level or range of a sentiment, for example very positive or just slightly positive.

Expression analysis program 112 determines the user rating of the screenshot based on the determined sentiment. For example, expression analysis program 112 determines the user is very happy based on sensor data indicating wide eyes and a large smile. Based on historical sentiment data from rating database 114, expression analysis program 112 determines the facial features to be very positive. In response to the sentiment determination, expression analysis program 112 determines the screenshot rating to be highly positive.

Expression analysis program 112 captures screenshots of mobile application 108 that are associated with the determined sentiment. In one embodiment, expression analysis program 112 captures a screenshot of application 108 associated with the determined sentiment via an outward facing camera (e.g., a camera facing away from the user) on wearable device 110. In another embodiment, expression analysis program 112 captures a screenshot of application 108 associated with the determined sentiment via communications with mobile device 106. In this embodiment, in response to the interaction (e.g., wink) by the user, wearable device 110 communicates via network 120 with mobile device 106, giving mobile device 106 directions to capture a screenshot of application 108. In response to capturing the screenshot, mobile device 106 stores the screenshot on rating database 114 for use by expression analysis program 112. Expression analysis program 112 uses the captured screenshot and eye tracking data from sensor unit 116 to determine the user focus area on the mobile device screen during the user interaction (e.g., wink).

In one embodiment, the generated screenshot ratings are used by application developers. In this embodiment, developers use the ratings to determine user satisfaction or dissatisfaction with specific features of an application. For example, a majority of application screenshots have high ratings (e.g., positive user experience) based on user sentiment; however, a screenshot of a keyboard within the application has generally low ratings (e.g., negative user experience). A developer uses this information to modify the keyboard feature of the application to improve the user experience.

In another embodiment, the generated screenshot ratings are used by digital distribution platform users. In some embodiments, screenshot ratings, in addition to application ratings, are made available to users of digital distribution platforms. User access to screenshot ratings may aid in the user decision to purchase an application from the digital distribution platform. For example, a user is looking for a specific functionality of a mobile application. The user generally does not purchase applications with lower than a four star rating. The user looks at an application in the digital distribution platform that has a three out of five star rating. However, in response to seeing the screenshot rating of five out of five stars for the user's needed function within the application, the user decides to purchase the application.

Sensor unit 116 executes locally on wearable device 110. Sensor unit 116 includes one or more cameras and one or more sensors. The cameras and sensors collect raw facial expression and screenshot data. Sensors in sensor unit 116 include, but are not limited to, eye tracking sensors and muscle movement sensors.

Figure 2:
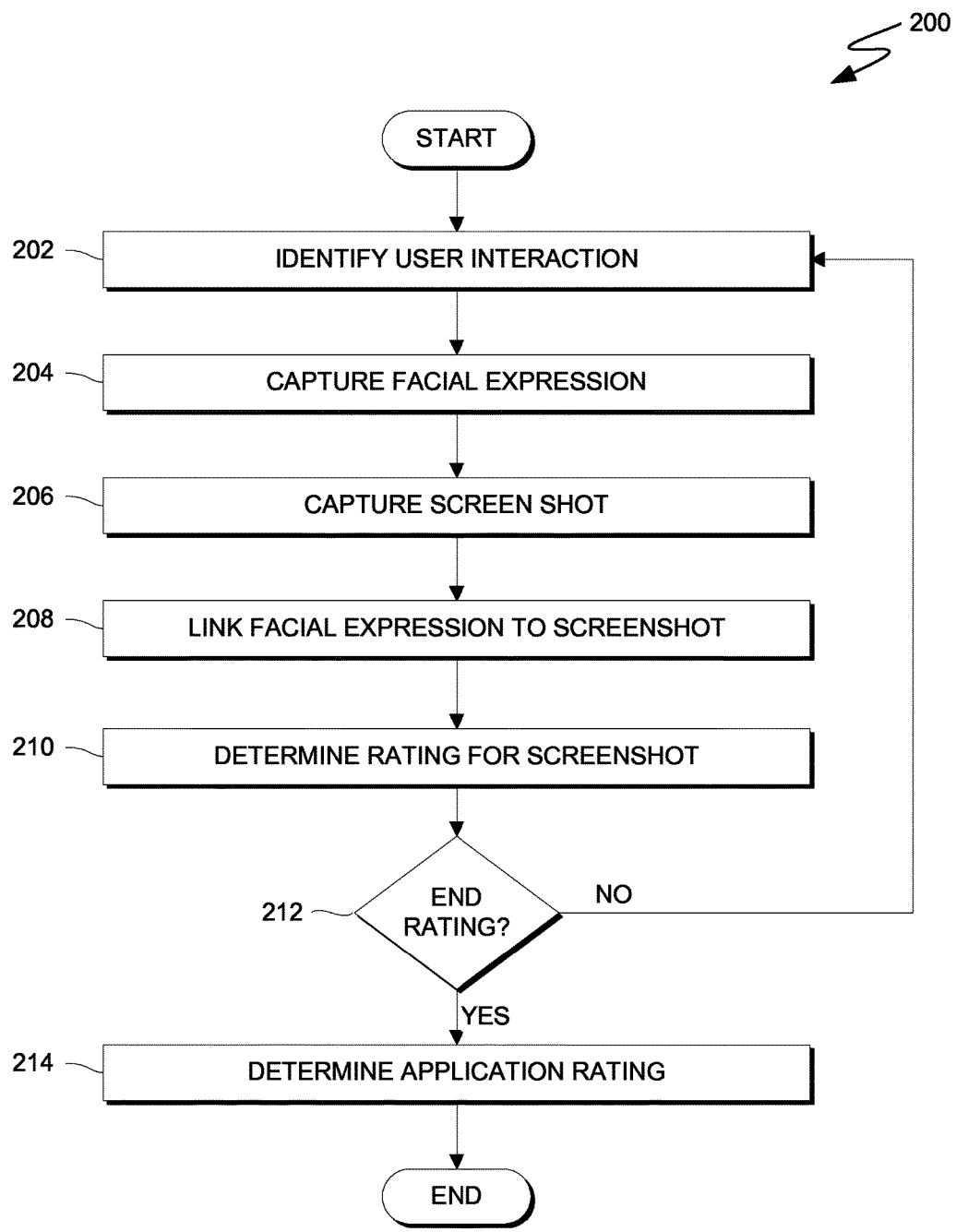
FIG. 2 is a flowchart depicting operations for rapid application review using wearable device, on a computing device within the computing environment of FIG. 1, in accordance with an embodiment of the present disclosure.

FIG. 2 is a flowchart depicting operations for rapid application review using a wearable computing device, on a computing device within the computing environment of FIG. 1, in accordance with an embodiment of the present disclosure. For example, FIG. 2 is a flowchart depicting operations 200 of expression analysis program 112, within computing environment 100.

In step 202, sensor unit 116 identifies an interaction. The interaction indicates permission, from a wearable device user, to capture a facial expression for rating purposes. In some embodiments, the interaction is a wink. In other embodiments, the interaction is a manual interaction with an input device (e.g., a track pad or a button) of wearable device 110. In yet other embodiments, the interaction is a voice command. In these embodiments, the user interaction is proximate in time to a facial expression by a user that indicates a sentiment of the user in relation to a mobile application (e.g., mobile application 108). For example, the user whose user experience was good could wink followed by smiling to indicate a positive sentiment.

In step 204, sensor unit 116 captures the user facial expression. In some embodiments, sensors in the wearable device monitor facial features. In these embodiments, wearable device 110 has sensors to measure the rate of eye movement, pupil size, or facial muscle movement. For example, eyes moving rapidly back and forth can indicate confusion, a dilated pupil can indicate surprise, and the strain of a facial muscle can indicate a smile or a scowl. In other embodiments, a picture is taken of a portion of the user face via a camera in sensor unit 116 of wearable device 110.

In these embodiments, the picture is analyzed by expression analysis program 112. Expression analysis program 112 retains or discards images subject to a privacy policy of the user. Expression analysis program 112 does not capture or retain images or other facial expression data without prior user authorization.

In step 206, sensor unit 116 captures a screenshot of mobile application 108 on mobile device 106. An eye tracking sensor in sensor unit 116 is used to determine the section of the screen on mobile device 106 on which the user is focused. For example, sensor data captured at the same time as the screenshot indicates the user's eyes are focused downward, indicating the user is looking at the bottom portion of the screen on mobile device 106. The screenshot is associated with the captured facial expression data. The screenshot and facial expression data are used to determine a user satisfaction or displeasure with a specific feature on the screen of mobile device 106. For example, a keyboard feature appears at the bottom of the screen on mobile device 106 that blocks other features of the application. The inability to access the blocked features may irritate the user. In this example, expression analysis program 112 identifies the user is focused on the keyboard during the rating and captures a screenshot of the mobile application along with the eye tracking data indicating a location within the screenshot. The screenshot of the mobile application, the eye tracking data indicating the location of the keyboard feature, and the associated facial expression data (e.g., a scowl) indicates user displeasure with the keyboard feature of the application.

In step 208, expression analysis program 112 associates the facial expression and screenshot in rating database 114. Associating the facial expression and screenshot allows rating program 104 to provide an aggregate rating for each screenshot of mobile application 108 for which users have provided a review. For example, a user who is irritated by a keyboard feature in an application is able to give the screenshot with the keyboard feature a low rating by frowning while focused on the keyboard. When another user rates the same keyboard feature of the mobile application, rating program 108 identifies that the screenshots are the same and aggregates the ratings. Associating the screenshot and the expression enables rating program 104 to determine an aggregate rating, for similar screenshots captured by different individuals using an instance of mobile application 108.

In step 210, expression analysis program 112 determines a rating for each screenshot. Expression analysis program 112 uses historical sentiment data stored in rating database 114 to determine the user rating based on a facial expression. Expression analysis program 112 analyzes the facial expression data captured by sensor unit 116. In response to capturing the facial expression, expression analysis program 112 communicates with rating database 114 to compare historical facial expression data to the captured facial expression. In response to comparing the facial expressions, expression analysis program determines a user sentiment based, at least in part, on the determined sentiment of the historical facial expression data. In some embodiments, the sentiments used by expression analysis program 112 include a level or range of a sentiment, for example very positive or just slightly positive. In some embodiments, the range of sentiment is converted to a scaled rating of one to five, wherein a one is highly negative, two is negative, three is neutral, four is positive, and five is highly positive. In these embodiments, the screenshot is given a user rating between one and five. In response to determining the screenshot rating for multiple users, rating program 104 averages the ratings to determine an aggregate screenshot rating.

In determination 212, expression analysis program 112 determines if the user is done providing ratings for the mobile application. In some embodiments, the expression analysis application continues to monitor the user facial expressions while the mobile application is in use. For example, the user makes an interaction to indicate permission to start a rating and wearable device 110 monitors the user facial expression until the user makes an interaction to stop the monitoring, e.g., another wink. A continuous monitoring of the user facial expression provides a comprehensive rating, as during the monitoring period each screenshot will have an individual rating. In other embodiments, the user makes an interaction for each rating, i.e., expression analysis program 112 only monitors long enough to capture the expression for one screenshot. In some embodiments, expression analysis program 112 determines that the user is done rating when use of mobile application 108 is suspended.

In step 214, rating program 104 determines an overall application rating. In some embodiments, a weighted average of each of the screenshot ratings is used to determine an application rating. For example, a screenshot with twice the number of user ratings as the other screenshots will receive twice the weight in the application rating. In other embodiments, the weight of each screenshot in the overall rating is configurable. For example, a developer pre-determines the weight of each screenshot, indicated in rating database 114; therefore, the weight is not dependent on the quantity of user ratings for each screenshot. In another example, the weightings are even for each screenshot.

Figure 3A:
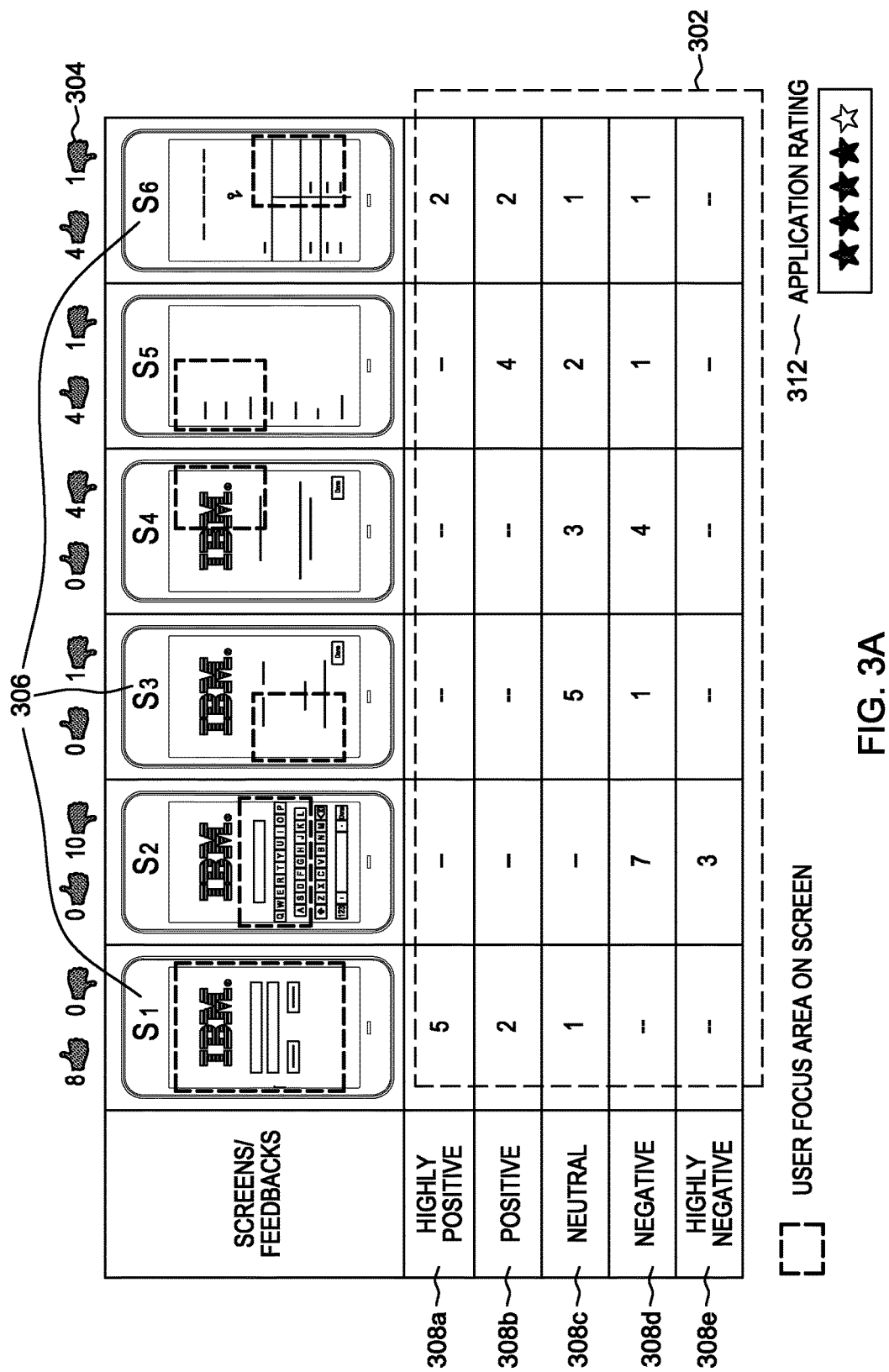
FIG. 3A is an example user interface presenting an aggregate review of an application by wearable device users, in accordance with an embodiment of the present disclosure.

FIG. 3A is an example user interface presenting an aggregate review of mobile application 108, in accordance with an embodiment of the present disclosure. For example, FIG. 3A depicts the output of rating program 104, on computing device 102 within computing environment 100.

FIG. 3A includes user counts 302, screenshots 306 (labelled S$_1$-S$_6$), screenshot rating 304, rating scale 308a-308e, and application rating 312. In some embodiments, the output of rating program 104 will include more or less information. For example, rating program 104 only outputs application rating 312.

Rating scale 308a-308e is the rating determined by rating program 104, based on the user facial expression. Rating scale 308a-308e correlates to facial expressions 310a-310e of FIG. 3B. In some embodiments, rating scale 308a-308e correlates to a star rating. For example, rating 308a correlates to five stars, 308b correlates to four stars, 308c correlates to three stars, 308d correlates to two stars, and 308e correlates to one star. The correlation between facial expressions 310a-310e, rating scale 308a-308e, and the star ratings provides a versatile representation of the mobile application rating.

User count 302 indicates the number of users who have rated each screenshot, broken down into each of the ratings on rating scale 308a-308e. For example, five users rated screenshot S$_1$ a highly positive rating 308a and two users rated it a positive rating 308b. User count 302 allows a visual display of the number of users who chose to provide a rating for a various screenshot.

Rating scale 308a-308e is a representation of a user experience based on the results of expression analysis program 112. Rating scale 308a-308e correlates to expression scale 310a-310e of FIG. 3B. For example, a user expression of smiling 310a is translated to a user experience of highly positive 308a on rating scale 308a-308e. The translation from user expression to user experience rating is done by expression analysis program 110 utilizing historical facial expression data stored on rating database 114. Based on the analysis, each user facial expression is converted to a user sentiment. In response to determining a user sentiment, the sentiment is translated to one of five user experience ratings of rating scale 308. The user experience ratings of rating scale 308a-308e are highly positive 308a, positive, 308b, neutral 308c, negative 308d, and highly negative 308e.

FIG. 3B depicts example facial expression patterns, in accordance with an embodiment of the present disclosure. FIG. 3B includes facial expressions 310a-310e, each of which represents a facial expression of a set of facial expressions. In one embodiment, each set of facial expressions corresponds to a rating of rating scale 308a-308e. Facial expressions 310a-310e are a representative scale of user facial expressions captured by expression analysis program 112 on wearable device 110. Whereas rating scale 308a-308e is limited to five ratings, there is no limit to expressions of expression scale 310a-310e.

Screenshots 306, of FIG. 3A, represent the user focus area on the mobile application when the review is given. In some embodiments, as depicted, an eye tracking sensor in the wearable device is able to determine the area of the screen the user is focused on (see step 206 and accompanying discussion). The focus area of each screenshot is depicted by a bolded dotted line in FIG. 3A. For example, the user is focused on the keyboard for the screenshot of screenshots 306 that is labelled $S_2$. In one embodiment, the focus area of a screenshot is identified as the user interface element of the screenshot that encompasses the location of the user focus. In another embodiment, the focus area of a screenshot is a quadrant or other partition of the screenshot that encompasses the location of the user focus. For example, expression analysis program 112 determines the focus area to be the upper-left quadrant of screenshot $S_5$ of screenshots 306 based on data from an eye tracking sensor that indicates that the user is directing attention to a point in the upper-left quadrant of the screen. In another embodiment, expression analysis program 112 determines the focus area to be the entire screenshot. For example, expression analysis program 112 receives inconclusive or indeterminate eye tracking data in association with screenshot $S_1$ of screenshots 306, based on which expression analysis program 112 determines the focus area to be the entire screenshot.

Screenshot rating 304 is the aggregate rating for each screenshot. Screenshot rating 304 is determined by tallying the ratings of a screenshot, wherein one or more users rated a screenshot. For example, screenshot S6 has two highly positive ratings 308a, two positive ratings 308b, a neutral rating 308c, and a negative rating 308d; therefore, screenshot $S_6$ has four good ratings and one bad rating. In some embodiments, neutral rating 308c does not affect screenshot rating 304. In one embodiment, stronger ratings have a larger effect on screenshot rating 304. For example, a highly positive ratings 308a counts as two good ratings while a positive rating 308b counts as one good rating. In another embodiment, the count of positive and negative ratings is independent of rating strength. For example, a negative rating 308d and highly negative rating 308e each count for one bad rating.

Application rating 312 is determined by an average of screenshot reviews. In some embodiments, the average is weighted based on the quantity of users who rate each screenshot. In another embodiment, the weighted average is configurable, such that the developer can pre-determine how much weight each screenshot has on application rating 312. In other embodiments, the weight of each screenshot in application rating 312 is determined by the number of users who rated the screenshot. For example, a screenshot rated by ten users will receive twice the weight as a screenshot rated by five users. In yet other embodiments, a straight average (e.g., no weighting) is used.

Figure 4:
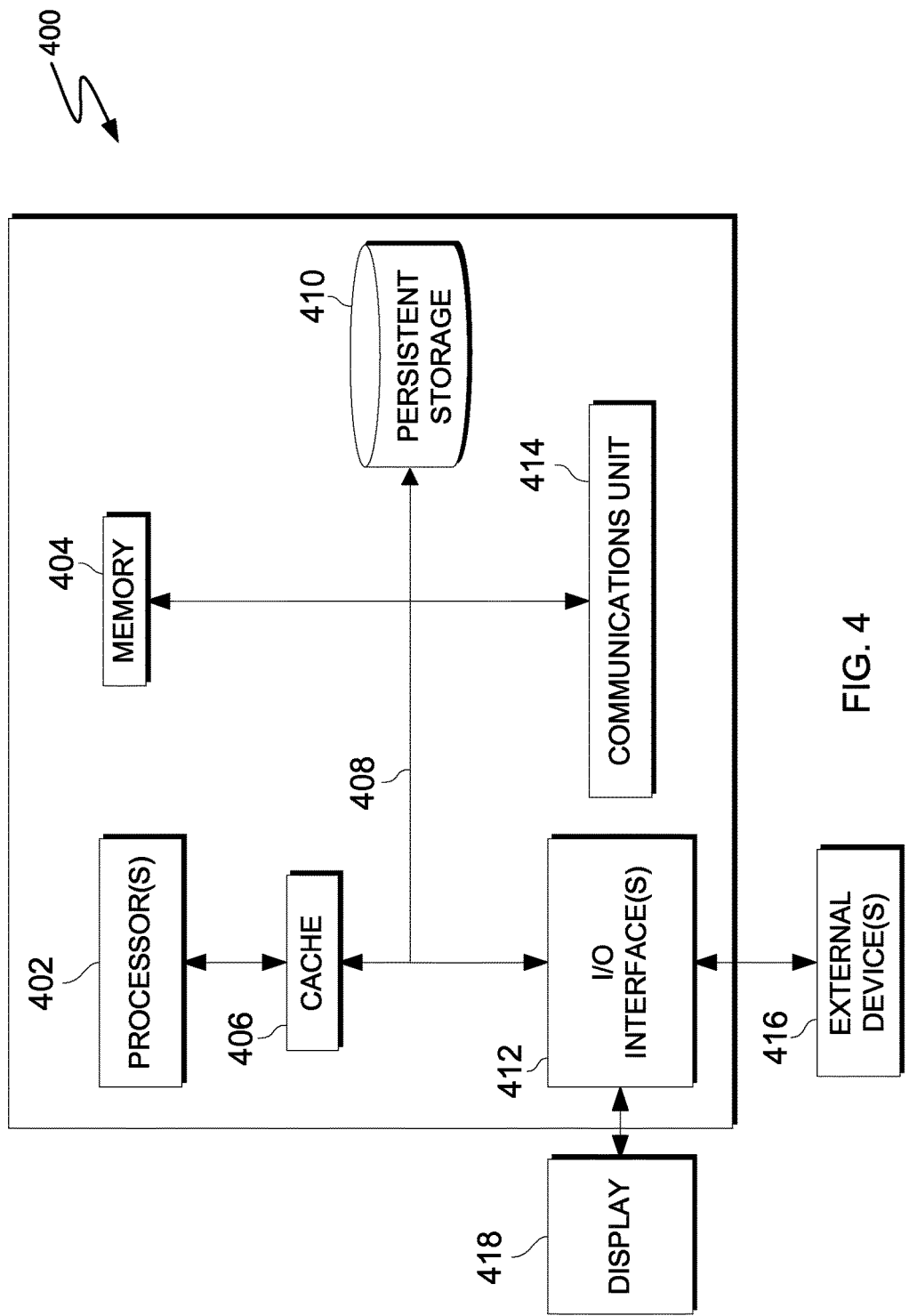
FIG. 4 is a block diagram of components of a computing device executing operations for rapid application review using a wearable computing device, in accordance with an embodiment of the present disclosure.

FIG. 4 is a block diagram of components of a computing device, generally designated 400, in accordance with an embodiment of the present disclosure. In one embodiment, computing device 400 is representative of computing device 102. For example, FIG. 4 is a block diagram of computing device 102 within computing environment 100 executing operations of rating program 104.

It should be appreciated that FIG. 4 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 120. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 318 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user computer, partly on the user computer, as a stand-alone software package, partly on the user computer and partly on a remote computer or entirely on the remote computer or server. In the latter scenario, the remote computer may be connected to the user computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for generating in-application user feedback, the computer program product comprising:
   a computer readable storage medium and program instructions stored on the computer readable storage medium, the program instructions comprising:
   program instructions to issue, by a first mobile device, an instruction to a second mobile device to capture a screenshot of a mobile application on the second mobile device based, at least in part, on facial expression data of a user of the second mobile device;
   program instructions to determine, by the first mobile device, a sentiment of the user corresponding to the facial expression data based, at least in part, on:
      learning characteristic facial expressions associated with the sentiment of the user;
      comparing the characteristic facial expressions to the one or more facial expression data; and
      adjusting the sentiment, based on the characteristic facial expression data, into an adjusted sentiment;
   program instructions to identify, by the first mobile device, at least a first user interface element and a second user interface element of the first mobile application included in the screenshot, wherein (i) at least one of the first user interface element and the second user interface element is a keyboard feature of the mobile application and (ii) the first user interface element obscures at least a portion of a feature associated with the second user interface element; and
   program instructions to generate, by the first mobile device, a rating for the first user interface element that relates to an accessibility of the feature associated with the second user interface element of the mobile application included in the screenshot based, at least in part, on determining a correlation between the adjusted sentiment and a focus area of the user with respect to the first user interface element and the second user interface element present on a display screen of the second device at a time the screenshot is captured.

2. The computer program product of claim 1, wherein the facial expression data is an image captured by a camera of the first mobile device.

3. The computer program product of claim 1, wherein the facial expression data is generated by one or more sensors in the first mobile device, wherein the one or more sensors includes at least one of an eye tracking sensor and a muscle movement sensor.

4. The computer program product of claim 1, wherein the screenshot is captured proximate in time to receiving the facial expression data.

5. The computer program product of claim 1, wherein the user focus area is determined, at least in part, by an eye tracking sensor.

6. A computer system for generating in-application user feedback, the computer system comprising:
   one or more computer processors;
   one or more computer readable storage media;
   program instructions stored on the computer readable storage media for execution by at least one of the one or more processors, the program instructions comprising:
   program instructions to issue, by a first mobile device, an instruction to a second mobile device to capture a screenshot of a mobile application on the second mobile device based, at least in part, on facial expression data of a user of the second mobile device
   program instructions to determine, by the first mobile device, a sentiment of the user corresponding to the facial expression data based, at least in part, on:
      learning characteristic facial expressions associated with the sentiment of the user;
      comparing the characteristic facial expressions to the one or more facial expression data; and
      adjusting the sentiment, based on the characteristic facial expression data, into an adjusted sentiment;
   program instructions to identify, by the first mobile device, at least a first user interface element and a second user interface element of the first mobile application included in the screenshot, wherein (i) at least one of the first user interface element and the second user interface element is a keyboard feature of the mobile application and (ii) the first user interface element obscures at least a portion of a feature associated with the second user interface element; and
   program instructions to generate, by the first mobile device, a rating for the first user interface element that relates to an accessibility of the feature associated with the second user interface element of the mobile application included in the screenshot based, at least in part, on determining a correlation between the adjusted sentiment and a focus area of the user with respect to the first user interface element and the second user interface element present on a display screen of the second device at a time the screenshot is captured.

7. The computer system of claim 6, wherein the facial expression data is generated by one or more sensors in the first mobile device, wherein the one or more sensors includes at least one of an eye tracking sensor and a muscle movement sensor.

8. The computer system of claim 6, wherein the screenshot is captured proximate in time to receiving the facial expression data.

9. The computer system of claim 6, wherein the user focus area is determined, at least in part, by an eye tracking sensor.

* * * * *